United States Patent
Wei et al.

(10) Patent No.: US 10,586,407 B2
(45) Date of Patent: Mar. 10, 2020

(54) TIRE WEAR DETECTION SYSTEM FOR AUTOMATED VEHICLE

(71) Applicant: Aptiv Technologies Limited, St. Michael (BB)

(72) Inventors: Junqing Wei, Bridgeville, PA (US); Ludong Sun, Pittsburgh, PA (US); Zachary Thomas Batts, Pittsburgh, PA (US); Jarrod M. Snider, Pittsburgh, PA (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 15/480,486

(22) Filed: Apr. 6, 2017

(65) Prior Publication Data

US 2018/0293815 A1   Oct. 11, 2018

(51) Int. Cl.
| | | |
|---|---|---|
| *B60C 11/24* | (2006.01) | |
| *G01M 17/00* | (2006.01) | |
| *G01M 17/02* | (2006.01) | |
| *G07C 5/08* | (2006.01) | |

(52) U.S. Cl.
CPC .......... *G07C 5/0808* (2013.01); *G01M 17/02* (2013.01)

(58) Field of Classification Search
None
See application file for complete search history.

(56) References Cited

U.S. PATENT DOCUMENTS

| | | | |
|---|---|---|---|
| 2002/0134149 A1* | 9/2002 | Shiraishi | ................. B60C 19/00 73/146 |
| 2003/0005759 A1 | 1/2003 | Breed et al. | |
| 2008/0216567 A1 | 9/2008 | Breed | |
| 2009/0205405 A1 | 8/2009 | Bauchot et al. | |
| 2011/0221587 A1 | 9/2011 | Katou | |
| 2015/0231932 A1* | 8/2015 | Singh | .................... B60C 11/246 701/34.4 |

FOREIGN PATENT DOCUMENTS

| | | |
|---|---|---|
| DE | 102013219662 | 3/2015 |
| KR | 10-2014-0080976 | 7/2014 |

OTHER PUBLICATIONS

ChanHo Park, GiSung Gwak, Minho Kwon, Do Ui Hong and Sung-Ho Hwang, Development of adaptive sideslip angle estimator; Journal of Advanced Mechanical Design, Systems, and Manufacturing, vol. 10, No. 2. (Year: 2016).*
International Search Report and Written Opinion in International Application No. PCT/US2018/024478, dated Jul. 4 2018, 26 pages.
PCT International Preliminary Report on Patentability in International Appln. No. PCT/US2018/024478, dated Oct. 8, 2019, 5 pages.
EP Search Report in European Appln. No. 18781277.1, dated Dec. 23, 2019, 7 pages.

* cited by examiner

*Primary Examiner* — Adam D Tissot
(74) *Attorney, Agent, or Firm* — Fish & Richardson P.C.

(57) ABSTRACT

A tire-wear detection system for an automated vehicle includes a steering-angle-sensor, a vehicle-path-detector, and a controller. The steering-angle-sensor indicates a steering-angle of a host-vehicle. The vehicle-path-detector indicates a turning-radius of the host-vehicle. The controller is in communication with the steering-angle-sensor and the vehicle-path-detector. The controller determines a wear-status of a tire of the host-vehicle based on the turning-radius and the steering-angle.

15 Claims, 2 Drawing Sheets

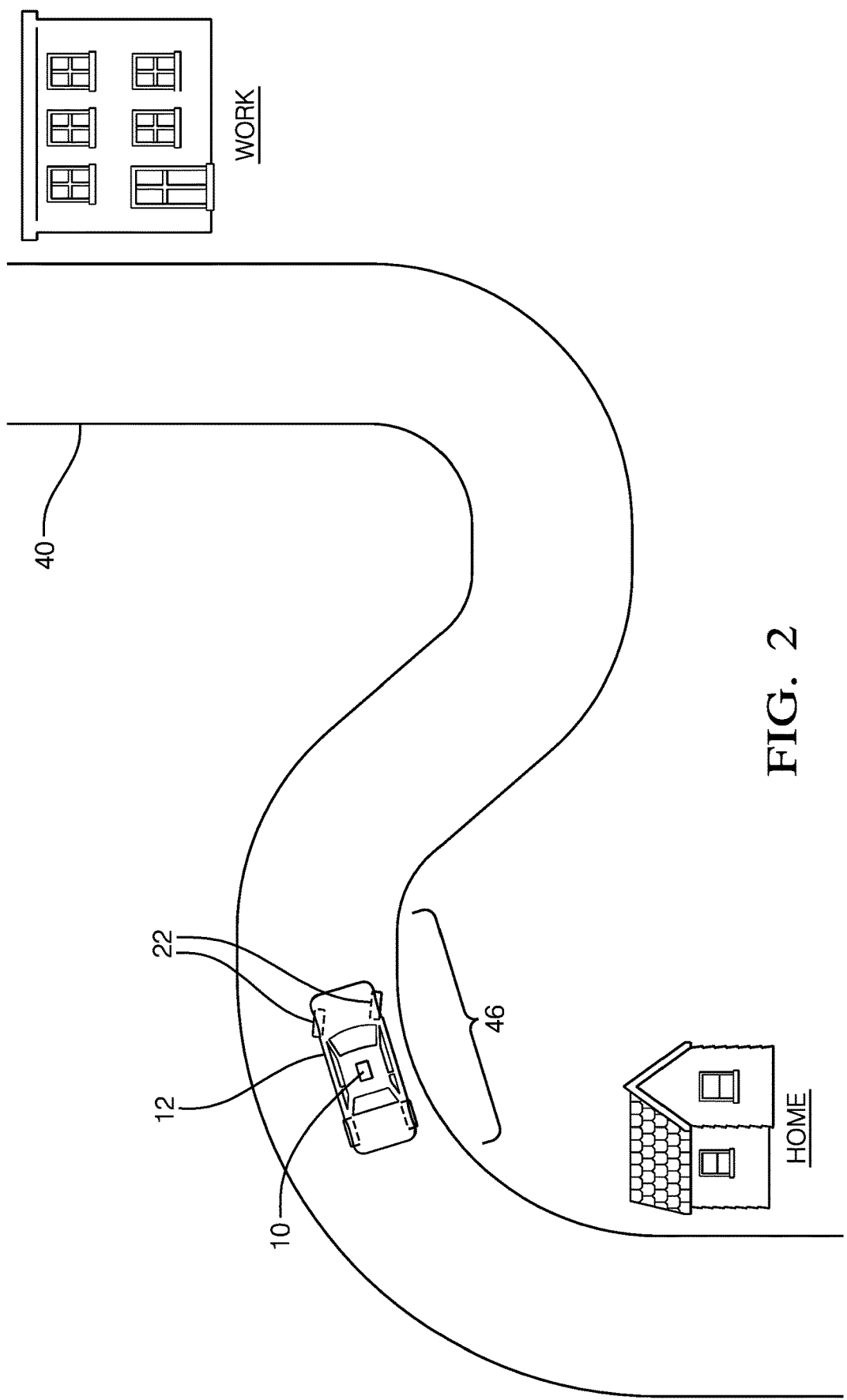

TIRE WEAR DETECTION SYSTEM FOR AUTOMATED VEHICLE

TECHNICAL FIELD OF INVENTION

This disclosure generally relates to a tire-wear detection system that determines a wear-status of a tire of a host-vehicle based on a turning-radius, a steering-angle, and optionally other factors.

BACKGROUND OF INVENTION

It is known that the cornering behavior of a vehicle changes with tire wear. However, a human-operator may not be able to perceive changes in cornering behavior as the tires slowly wear.

SUMMARY OF THE INVENTION

Described herein is a tire-wear detection system that gathers historical information of cornering behavior of a host-vehicle. It may be advantageous for the system to gather data for a frequently traveled corner, but is it recognized that some vehicles are not used in a manner that provides for this type of data collection. The system also indicates when new tires are needed.

In accordance with one embodiment, a tire-wear detection system for an automated vehicle is provided. The system includes a steering-angle-sensor, a vehicle-path-detector, and a controller. The steering-angle-sensor indicates a steering-angle of a host-vehicle. The vehicle-path-detector indicates a turning-radius of the host-vehicle. The controller is in communication with the steering-angle-sensor and the vehicle-path-detector. The controller determines a wear-status of a tire of the host-vehicle based on the turning-radius and the steering-angle.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIG. 2 is an illustration of a roadway traveled by a host-vehicle equipped with the system of FIG. 1 in accordance with one embodiment.

DETAILED DESCRIPTION

Figure 1:
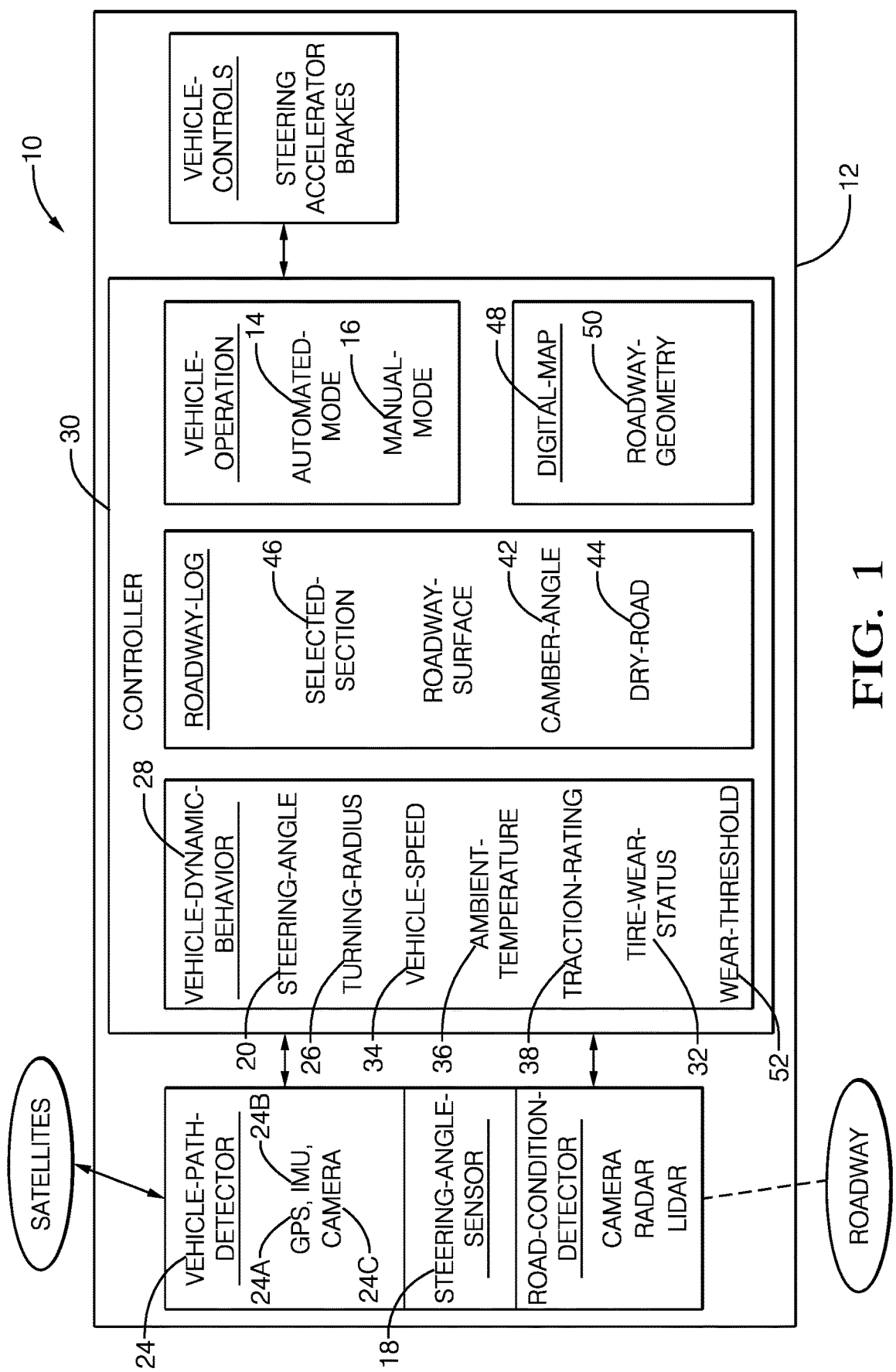
FIG. 1 is a diagram of a tire-wear detection system in accordance with one embodiment.

FIG. 1 illustrates a non-limiting example of a tire-wear detection system 10, hereafter referred to as the system 10, which is suitable for use by an automated vehicle, e.g. a host-vehicle 12. As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination in order to operate the host-vehicle 12. However, full automation is not a requirement. It is contemplated that the teachings presented herein are useful when the host-vehicle 12 is operated in a manual-mode 16 where the degree or level of automation may be little more than providing an audible or visual warning to the human-operator who is generally in control of the steering, accelerator, and brakes of the host-vehicle 12. For example, the automation may merely assist the human-operator as needed to change lanes and/or avoid interference with and/or a collision with, for example, another-vehicle.

The system 10 includes a steering-angle-sensor 18 mounted on the host-vehicle 12 that indicates a steering-angle 20 of the host-vehicle 12, i.e. the angle of the steering-wheels 22 (FIG. 2) of the host-vehicle 12, which are typically the front-wheels of a vehicle. The steering-angle-sensor 18 may be mechanically coupled to the steering-wheels 22, or may determine the steering-angle 20 by monitoring the relative position of some other component of a steering-mechanism (not-shown) of the host-vehicle 12, e.g. a steering-box. The steering-angle-sensor 18 may be a potentiometer, a Linear Variable Differential Transformer (LVDT), an optical-encoder, or any other means of detecting position that will be recognized by those in the position sensing arts.

The system 10 includes a vehicle-path-detector 24 that indicates, but is not limited to indicating, a turning-radius 26 of the host-vehicle 12. As will be explained in more detail later, the turning-radius 26 of the host-vehicle 12 is a good indicator of tire-wear of one or more of the tires of the host-vehicle 12. By way of example and not limitation, the vehicle-path-detector 24 may include or may consist of one or more of an inertial-measurement-unit 24A (IMU 24A), a global-position-sensor 24B (GPS 24B), and/or a camera 24C. The IMU 24A may include a yaw-rate-sensor and lateral-accelerometer that can be used to determine a dynamic-behavior 28 of the host-vehicle 12. The GPS 24B may be used to determine a curvature of the roadway presently traveled by the host-vehicle 12, and a vehicle-speed of the host-vehicle 12, which may be used to determine or help indicate the dynamic-behavior 28. The camera 24C may be used to determine how well the host-vehicle 12 is able to follow a center-line of the roadway presently traveled by the host-vehicle 12.

The system 10 includes a controller 30 in communication with the steering-angle-sensor 18 and the vehicle-path-detector 24. The communication may be by way of wires, optical-cable, or wireless communications as will be recognized by those in the art. The controller 30 may include a processor (not specifically shown) such as a microprocessor or other control circuitry such as analog and/or digital control circuitry including an application specific integrated circuit (ASIC) for processing data as should be evident to those in the art. The controller 30 may include memory (not specifically shown), including non-volatile memory, such as electrically erasable programmable read-only memory (EEPROM) for storing one or more routines, thresholds, and captured data. The one or more routines may be executed by the processor to perform steps for determining a wear-status of a tire of the host-vehicle based on signals received by the controller 30 from the steering-angle-sensor 18 and the vehicle-path-detector 24 as described herein.

The controller 30 is generally configured or programmed to determine a wear-status 32 of one or more of the tires of the host-vehicle 12 based on the turning-radius 26 and the steering-angle 20. Optionally, the determination of the wear-status 32 may be further determined based on, but not limited to, one or more of a vehicle-speed 34 of the host-vehicle 12, an ambient-temperature 36, a traction-rating 38 of a roadway 40 (FIG. 2) traveled by the host-vehicle 12, and a camber-angle 42 of the roadway 40 traveled by the host-vehicle 12. As will be recognized by those in the art, the performance of a tire can be affected by the ambient-temperature 36 which influences the temperature of the tires. By way of further example and not limitation, the traction-rating 38 may be a dry-road 44 a wet road, a snow-covered road, or a gravel-road. Also, an off-camber turn where the roadway is slopped away from the inside of turn can require an increase in the steering-angle 20 for the host-vehicle 12 to stay on the roadway.

These various factors may influence the turning-radius 26 of the host-vehicle 12 when the steering-angle 20 is equal to or substantially equal to some particular value. The system 10 is able to determine the wear-status 32 because the steering-angle 20 necessary for the host-vehicle 12 to track or follow a selected-section 46 of the roadway 40 will increase as the tires of the host-vehicle 12 wear. That is, it will be necessary to increase the steering-angle 20 to maintain the turning-radius 26 on the selected-section 46, or on another section of the roadway 40 that has similar physical-characteristics such as the traction-rating 38 and/or the camber-angle 42 and/or the curve-radius of the roadway 40. Of these various examples of the traction-rating 38, it is believed that the dry-road 44 may provide the most consistent indications of the wear-status 32, so the wear-status 32 may only be determined when the host-vehicle 12 travels the selected-section 46 of the roadway 40.

FIG. 2 illustrates a non-limiting example of the roadway 40 that may be traveled frequently by the host-vehicle 12, from a home to a place of work for example. It would be preferable for the wear-status 32 to be determined on the same instance of the selected-section 46 on a regular basis, e.g. daily, particularly if the traction-rating 38 corresponded to the dry-road 44 when the wear-status 32 was determined. However, it is recognized that for some instances of the host-vehicle 12 this may not be feasible. For example, the host-vehicle 12 may be part of a fleet of rental-vehicles or business-use-vehicles that have different operators who travel to different destinations each time the host-vehicle 12 is used. In this situation, it may be that the selected-section 46 may not be the same section of the roadway 40, but may be selected from a digital-map 48 (FIG. 1) because the route to the designated destination may include a section of the roadway 40 that has a roadway-geometry 50 (e.g. certain values for the traction-rating 38 and/or the camber-angle 42 and/or the curve-radius of the roadway 40) that meets certain criteria and so would be suitable to use to determine the wear-status 32 when the host-vehicle 12 travels that section of the roadway 40.

Returning to FIG. 1, the controller 30 may be further configured to indicate that a tire or multiple tires of the host-vehicle 12 needs to be replaced when the wear-status 32 is less than a wear-threshold 52. By way of example and not limitation, the wear-status 32 may be arbitrarily set to a value of one-hundred (100) when the tires are new, e.g. when the host-vehicle 12 is new, and that number may be reduced as mileage accumulates on the tires. Empirical testing and/or computer modeling may be used to determine what value should be used for the wear-threshold 52.

When one or more of the tires are replaced, or the tires are rotated, that fact may preferably be manually entered into the controller 30. However, it is contemplated that a sudden improvement in the dynamic-behavior of the host-vehicle 12 may be detected by the controller 30 and used as a basis to reset the wear-threshold 52. That is, if a sudden improvement in the dynamic-behavior of the host-vehicle 12 and persists for several determinations of the wear-status 32, the controller 30 may be programmed to assume that new tires have been installed and ignore the history of the wear-status 32 prior to the sudden improvement in the dynamic-behavior.

Accordingly, a tire-wear detection system (the system 10), a controller 30 for the system 10, and a method of operating the system 10 is provided. As the tires of the host-vehicle 12 wear, the steering-angle 20 will need to be increased for the host-vehicle 12 to properly follow the shape of a particular type of curve in the roadway 40. By regularly determining the wear-status 32 of the tires, the owner of the host-vehicle 12 can be notified that the tires need to be replaced before operation of the host-vehicle 12 becomes less than substantially safe.

While this invention has been described in terms of the preferred embodiments thereof, it is not intended to be so limited, but rather only to the extent set forth in the claims that follow.

We claim:

1. A tire-wear detection system for an automated vehicle, said system comprising:
   a steering-angle-sensor that indicates a steering-angle of a host-vehicle;
   a vehicle-path-detector that indicates a turning-radius of the host-vehicle; and
   a controller in communication with the steering-angle-sensor and the vehicle-path-detector, wherein the controller determines a wear-status of a tire of the host-vehicle based on a change in the turning-radius and the steering-angle measured at two different times while the host-vehicle travels a selected-section of roadway or another section of roadway having at least one physical-characteristic of the selected-section of roadway.

2. The system in accordance with claim 1, wherein the wear-status is further determined based on one or more of a vehicle-speed of the host-vehicle, an ambient-temperature, a traction-rating of a roadway traveled by the host-vehicle, and a camber-angle of the roadway traveled by the host-vehicle.

3. The system in accordance with claim 2, wherein the wear-status is determined when the traction-rating is a dry-road.

4. The system in accordance with claim 1, wherein the controller indicates that a tire of the host-vehicle needs to be replaced when the wear-status is less than a wear-threshold.

5. The system in accordance with claim 1, wherein the vehicle-path-detector includes one or more of an inertial-measurement-unit (IMU), a global-position-sensor (GPS), and a camera.

6. A method comprising:
   obtaining, using a steering-angle-sensor, a steering-angle of a host-vehicle;
   obtaining, using a vehicle-path-detector, a turning-radius of the host-vehicle; and
   determining, using a controller, a wear-status of a tire of the host-vehicle based on a change in the turning-radius and the steering-angle measured at two different times while the host-vehicle travels a selected-section of roadway or another section of roadway having at least one physical-characteristic of the selected-section of roadway.

7. The method in accordance with claim 6, wherein the wear-status is further determined based on one or more of a vehicle-speed of the host-vehicle, an ambient-temperature, a traction-rating of a roadway traveled by the host-vehicle, and a camber-angle of the roadway traveled by the host-vehicle.

8. The method in accordance with claim 7, wherein the wear-status is determined when the traction-rating is a dry-road.

9. The method in accordance with claim 6, further comprising:
   generating, by the controller, a wear-status indicator indicating that a tire of the host-vehicle needs to be replaced when the wear-status is less than a wear-threshold.

10. The method in accordance with claim 6, wherein the vehicle-path-detector includes one or more of an inertial-measurement-unit (IMU), a global-position-sensor (GPS), and a camera.

11. A non-transitory, computer-readable storage medium having instructions stored thereon that when executed by a controller of a host vehicle, cause the controller to perform operations comprising:
   obtaining, using a steering-angle-sensor, a steering-angle of a host-vehicle;
   obtaining, using a vehicle-path-detector, a turning-radius of the host-vehicle; and
   determining, using a controller, a wear-status of a tire of the host-vehicle based on a change in the turning-radius and the steering-angle measured at two different times while the host-vehicle travels a selected-section of roadway or another section of roadway having at least one physical-characteristic of the selected-section of roadway.

12. The non-transitory, computer-readable storage medium in accordance with claim 11, wherein the wear-status is further determined based on one or more of a vehicle-speed of the host-vehicle, an ambient-temperature, a traction-rating of a roadway traveled by the host-vehicle, and a camber-angle of the roadway traveled by the host-vehicle.

13. The non-transitory, computer-readable storage medium in accordance with claim 12, wherein the wear-status is determined when the traction-rating is a dry-road.

14. The non-transitory, computer-readable storage medium in accordance with claim 11, the operations further comprising:
   generating, by the controller, a wear-status indicator indicating that a tire of the host-vehicle needs to be replaced when the wear-status is less than a wear-threshold.

15. The non-transitory, computer-readable storage medium in accordance with claim 11, wherein the vehicle-path-detector includes one or more of an inertial-measurement-unit (IMU), a global-position-sensor (GPS), and a camera.

* * * * *